United States Patent [19]
Vaughan

[11] Patent Number: 5,382,420
[45] Date of Patent: Jan. 17, 1995

[54] ECR-33: A STABILIZED RARE-EARTH EXCHANGED Q TYPE ZEOLITE

[75] Inventor: David E. W. Vaughan, Flemington, N.J.

[73] Assignee: Exxon Research & Engineering Company, Florham Park, N.J.

[21] Appl. No.: 111,353

[22] Filed: Aug. 24, 1993

Related U.S. Application Data

[63] Continuation-in-part of Ser. No. 950,539, Sep. 25, 1992, abandoned.

[51] Int. Cl.$^6$ .............................................. C01B 33/34
[52] U.S. Cl. ................................... 423/716; 423/700; 502/73
[58] Field of Search ................. 502/73; 423/DIG. 21, 423/716, 700

[56] References Cited

U.S. PATENT DOCUMENTS

| | | | |
|---|---|---|---|
| 2,991,151 | 7/1961 | Breck et al. | 502/60 |
| 3,140,253 | 7/1964 | Plank et al. | 502/73 |
| 3,474,025 | 10/1969 | Garwood | 502/73 |
| 3,957,623 | 5/1976 | McDaniel et al. | 502/73 |
| 4,164,483 | 8/1979 | Alafandi et al. | 502/73 |

*Primary Examiner*—Carl F. Dees
*Attorney, Agent, or Firm*—Ronald D. Hantman

[57] ABSTRACT

The present invention is a rare-earth exchanged form of zeolite Q, which shows high thermal stability, and properties characteristic of a 12-ring zeolite structure.

6 Claims, 3 Drawing Sheets

ECR-33: A STABILIZED RARE-EARTH EXCHANGED Q TYPE ZEOLITE

This application is a continuation-in-part of U.S. Ser. No. 950,539 filed Sep. 25, 1992 and now abandoned.

BACKGROUND OF THE INVENTION

The present invention is a zeolite composition. In particular, it is a rare-earth exchanged form of zeolite Q.

Zeolite Q is a well-known zeolite (U.S. Pat. No. 2,991,151), having no useful properties because it shows major structural collapse on dehydration at temperatures as low as 240° C. This is almost unique amongst silica-alumina zeolites, most of which are stable to dehydration. Because of its low chemical and thermal stability, no structural work on Q has successfully definitively defined its framework topology. A review by Sherman (A.C.S. Symp. Ser. 40, p. 30 (1977)) equated zeolite Q with zeolite KI, and the Q-KI composition may be defined as:

$$KAlSiO_4 \cdot xH_2O$$

The Si/Al ratio is always unity, and the hexagonal unit cell is a=13.4Å, c=13.2 Å. A recent study by Andries et al (Zeolites, v. 11, p. 116; 124 (1991)) shows that this zeolite probably has a 12-ring channel perpendicular to the platelet crystals—an analogous structure to the BePO$_4$-H material (Harvey, Zeit. Kristallogr., v. 182, p. 123 (1988)). Q should therefore have useful catalytic and sorption properties, if it can be stabilized.

The original patent gives properties for a variety of cation exchanged forms of Q (Na, Li, K, Ca, Mg, Zn, Sr, Ba), indicating that they have properties characteristic of a small pore molecule sieve, and the pore size is given by Sherman as 3.6 Å, characteristic of 8-rings. The major deficiency of Q is that its structure collapses at about a temperature of 230° C.—an exceedingly low temperature for a zeolite, and possibly indicative of a highly hydroxylated structure —and that it has low stability at pH below about 6.5.

SUMMARY OF THE INVENTION

The objective of this invention is to stabilize zeolite Q sufficiently to make it useful for sorption, separation and catalytic uses.

The present invention is a synthetic crystalline zeolite (hereinafter referred to as ECR-33) having the composition in terms of mole ratios in the dehydrated state:

$$(xK^+, yH^+, zR^{3+})AlSiO_4$$

where R is a rare-earth element and x=0.2 to 0.8, y=0 to 0.2, z=0.05 to 0.25. In a preferred embodiment the rare earth is Lanthanum, and the exchange is done at a pH between 5.0 and 6.8. A short contact mode process is most desirable, best demonstrated in a filter exchange process.

A surprising element of this material is that stability is established at high base levels, and that small amounts of rare-earth stabilize the structure. In zeolite Q, a low Si/Al ratio material; removal of all the K+ by La$^{3+}$ will result in structural collapse caused by dealumination of the structure under the required low pH exchange conditions.

A balance is needed in the exchange procedure to achieve sufficient La$^{3+}$ exchange without removing Al$^{3+}$ from framework sites. This is achieved by exchanging within the above pH range, so limiting the K+ removal only to about 75%. Although the residual base levels are significantly above conventional catalyst levels for acid catalysed materials, it is thought that stabilization is achieved with low exchange levels because La$^{3+}$ locates in the side-pockets lining the 12-ring channel of this otherwise metastable structure, preventing the normal collapse on dehydration.

DESCRIPTION OF THE PREFERRED EMBODIMENT

The present invention is a Q zeolite with rare-earth cation(s) exchanged into the structure. It has been discovered that when Q is exchanged with rare-earth cations, such as La$^{3+}$, the material not only is stabilized, but that it develops properties characteristic of a large pore molecular sieve when dehydrated. The rare-earths cations include those of the elements La, Ce, Pr, Md, Pm, Sm, Ea, Gd, Tb, Dy, Ho, Er, Tm, Yb or Lu, at a pH above about 4.5. Indeed sorption experiments indicate that it does have 12-ring pores analogous to zeolite L or cancrinite like ECR-5, and consistent with the structure conclusions made by Andries (referenced above). Hexane sorption isotherms at room temperature show a sorption capacity of about 6 wt % for La Q, very similar to that for zeolite L, and higher than that observed for ECR-5, both other 12-ring channel zeolites.

The difficulty in this process is to complete the exchange at a sufficiently high pH that the Q material is not dealuminated and degraded (pH > about 4.5), but at a pH which avoids excessive precipitation of the rare-earth hydroxide at about pH=6.6. A filter exchange may be preferred.

Even small amounts of rare-earth exchange stabilize the Q structure, and even exhaustive exchange retains high levels of K+ in Q. Despite the high base levels and low rare earth exchange La,KQ shows major structural enhancement.

Materials of this type are useful for the separation of paraffins from olefins, n-paraffins from iso-paraffins, single branched from multiple branched paraffins and olefins, and in several catalytic applications. If Q can be synthesized at a higher Si/Al ratio (an ongoing program), it may be of interest in aromatisation and isomerization of paraffins and dewaxing of lube stocks.

Small amounts of precipitated rare-earth hydroxides (converted to oxides on heating) do not adversely effect the properties of the exchanged materials in most applications. Alternatively, the apparent excess cation charge charge may indicate that exchange includes species such as La(OH)$^{2+}$ and La(OH)$_2^+$ in addition to La$^{3+}$.

EXAMPLE 1

Figure 1:
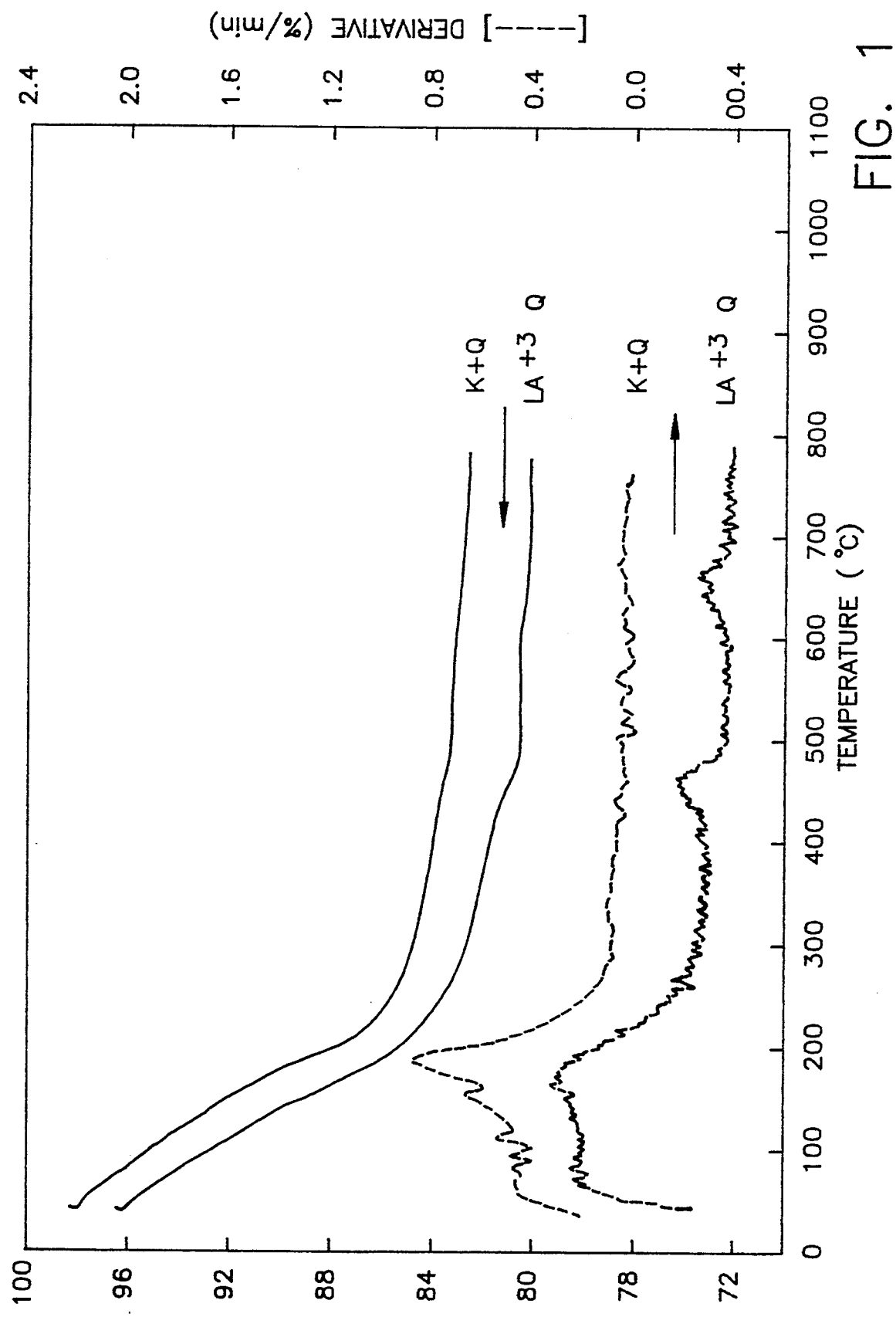
FIG. 1 shows a thermogravimetric analysis of zeolite Q (with cation K+) and the present invention with cation La$^{+3}$, together with their derivatives scans.

A reactant stoichiometry of 2.1 K$_2$O:Al$_2$O$_3$:2SiO$_2$:80-H$_2$O was formulated by first dissolving 33.58 gms Alcoa C-31 alumina (Al$_2$O$_3$·3H$_2$O) in a solution of 58.6 gms KOH in 90 gms H$_2$O at 80° C. After cooling to room temperature, this solution was mixed with a solution of 64.6 gms colloidal silica (Ludox HS-40, DuPont Co.) in 153.3 gms H$_2$O. The mixture was then reacted in a Teflon (DuPont Co.) jar for three days at 100° C. The final product was filtered, washed with water, then dried at 110° C. X-ray diffraction showed that it was excellent zeolite Q. Evaluation of the thermal stability of this sample using a Guinier-Linne high temperature powder diffraction camera showed that the structure collapsed at 240° C., giving an amorphous product. Thermogravimetric analysis of potassium Q showed a 14 wt % water loss prior to structure collapse (FIG. 1a). Chemical analysis (ICP-AES) gave a composition of 14.2% Si; 13.5% Al and 19.0% K representing a KQ stoichiometry of:

KAlSiO$_4$

EXAMPLE 2

Figure 2:
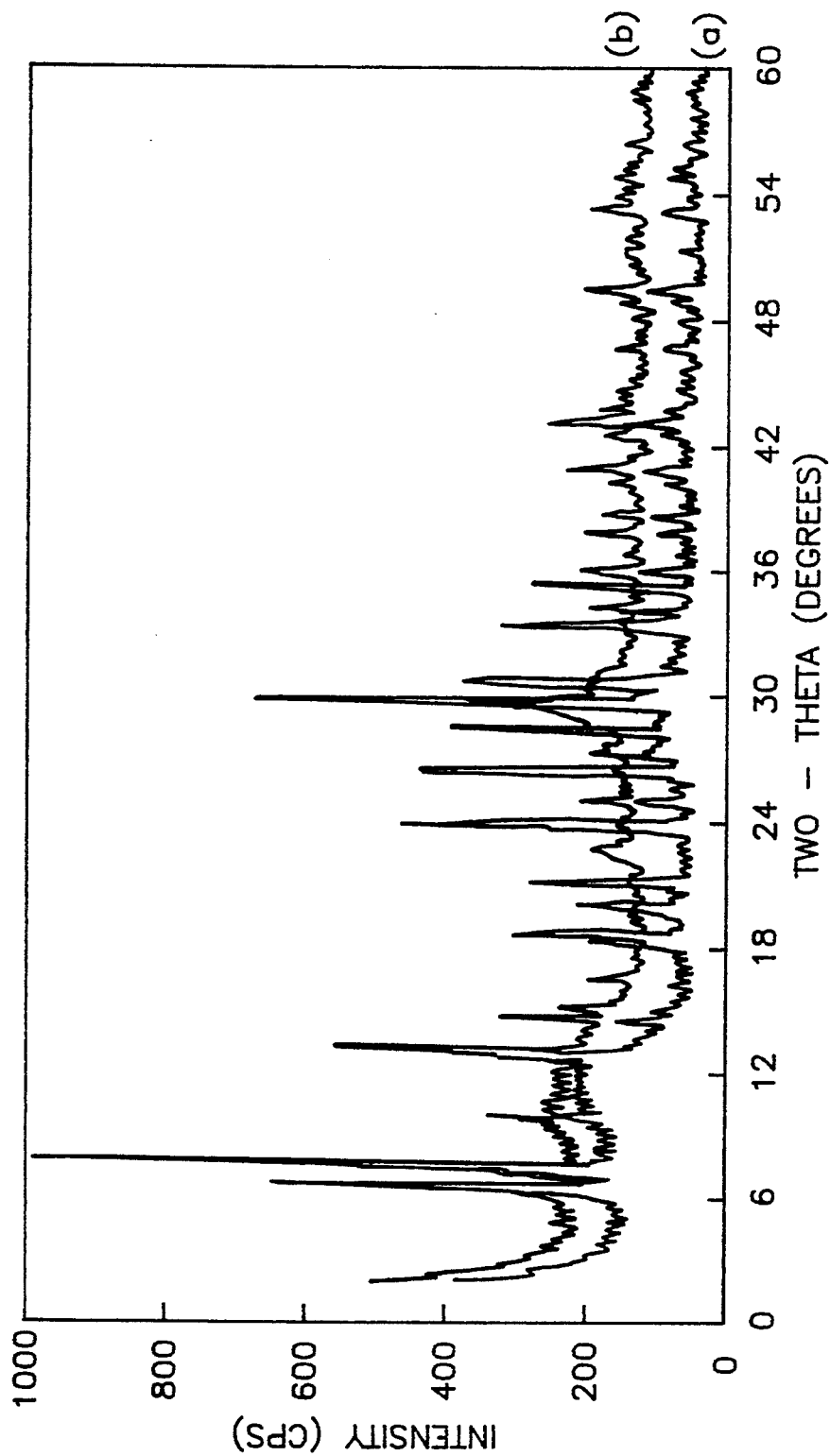
FIG. 2 shows an x-ray diffraction pattern of the composition of the present invention after heating at 100° C. (2a) and 500° C. (2b).

5 gms KQ of Example 1 were exchanged with a solution of 5 gm LaCl$_3$—6H$_2$O in 50 gm H$_2$O, keeping the pH at about 5.8 throughout the room temperature exchange. After one hour, the sample was filtered, washed with 100 gm H$_2$O, and the filter cake re-exchanged with LaCl$_3$ in a like manner. After the second exchange, the product was filtered, washed, and dried at 110° C. X-ray powder patterns obtained after 100° C. and 500° C. treatments are shown in FIG. 2. High temperature x-ray diffraction using a Guinier-Linne camera showed that the structure was still intact at 800° C. Analysis of the room temperature x-ray diffraction pattern showed that La Q retains hexagonal or near symmetry, but with a "C" axis repeat reduced from 13.18 Å to 13.13 Å. Chemical analysis (ICPAES) gave the following results: 13.5% Si; 13.1% Al; 11.7% K; 9.76% La, representing a zeolite stoichiometry of:

(0.62 K, 0.14 La) AlSiO$_4$ indicating that about 10% of the La$^{3+}$ is precipitated or present as hydroxylated species of the form La(OH)$^{2+}$ or La(OH)$_2{}^+$.

Figure 3:
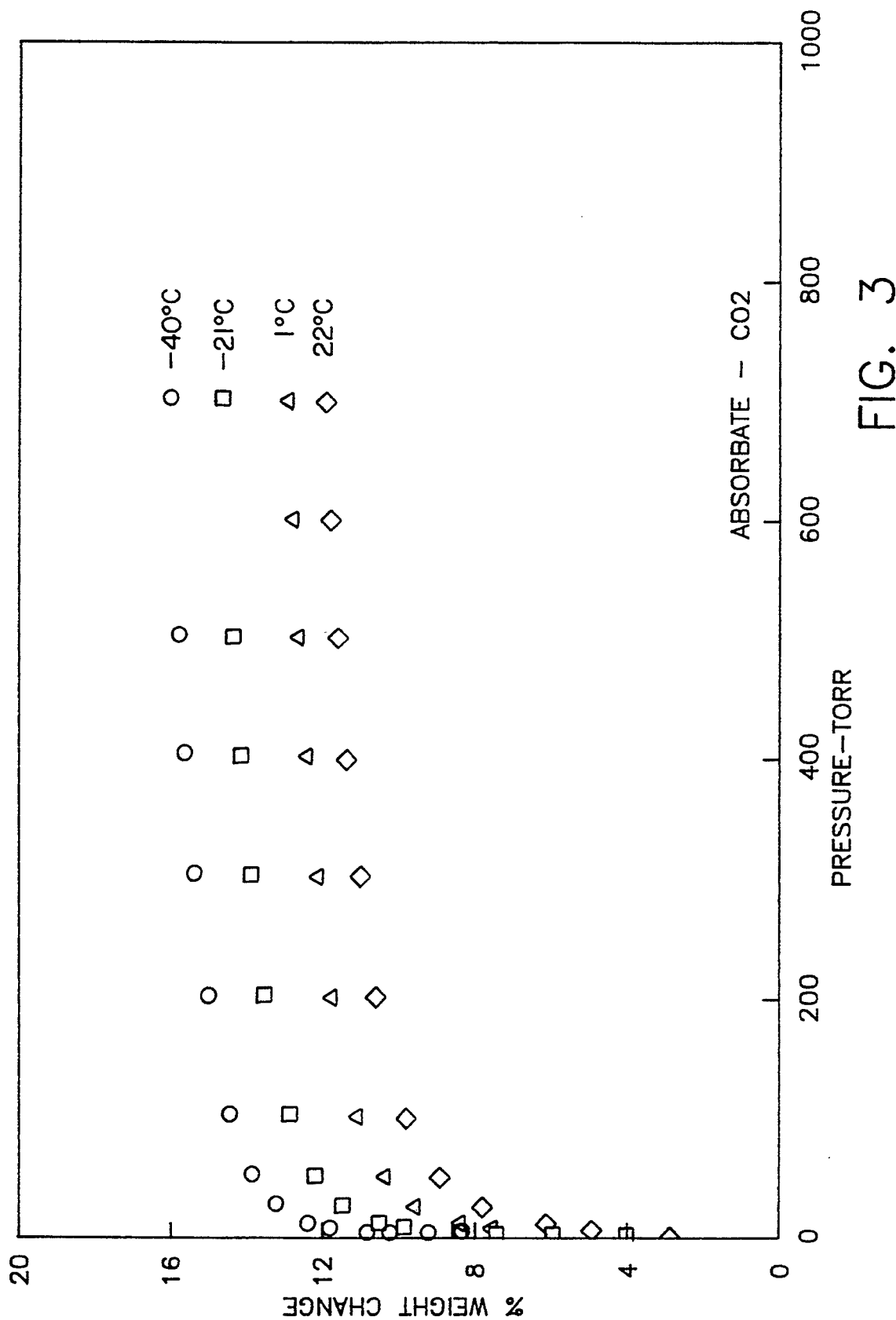
FIG. 3 shows several CO$_2$ sorption isotherms at the temperatures indicated for the composition of the present invention.

Thermogravinetric analysis showed a water weight loss of 18 wt % at 670° C. (FIG. 1b). A normal hexane sorption isotherm at 23° C., gave a maximum sorption capacity of 5.8 wt % at 10 torr pressure. A series of CO$_2$ sorption isotherms, shown in FIG. 3, indicate a maximum sorption capacity of about 16 wt %. The small amount of precipitated La$_2$O$_3$ does not effect the sorption.

EXAMPLE 3

0.5 gm LaCl$_3$ 6 H$_2$O was dissolved in 40 ml absolute ethanol. 1.2 g of the K-Q product of Example 1 was added and the slurry stirred for 10 minutes at room temperature. The product was filtered, washed with ethanol and air dried. The x-ray diffraction pattern showed excellent Q and a thermogravimetric analysis gave a weight loss of 16.7 wt % occurring below 400° C. X-ray analysis of the product calcined at 400° C. showed that the La Q product was highly crystalline. Chemical analysis gave a product stoichimetry of:

(0.57 K, 0.13 H, 0.1 La) AlSiO$_4$

The change deficiency is presumably balanced by H+ in this acidic exchange.

EXAMPLE 4

5 gm KQ zeolite of Example 1 was exchanged with a solution of 1.5 gm LaCl$_3$. 6H$_2$O in 50 ml H$_2$O at a pH between 6.5 and 6.8, controlled by the appropriate addition of 0.2 N HCl during the room temperature exchange. After 30 minutes the slurry was filtered, washed with distilled water, then dried at 110° C. Chemical analysis (IC PAES) gave a product stoichiometry of:

(0.51 K, 0.1 H, 0.13 La) Al SiO$_4$ indicating that 10% of the exchange capacity was satisfied by H+. (The exchange cation composition is shown in brackets.)

EXAMPLE 5

The product of Example 4 was calcined for 25 hours at 350° C. X-ray diffraction showed no crystallinity loss. This material was re-exchanged in the manner given in Example 4. chemical analysis of the product (ICPAES) gave a zeolite stoichiometry:

(0.42 K, 0.13 H, 0.15 La) Al SiO$_2$

EXAMPLE 6

3 gms of the product of Example 5 was exchanged with a solution of 1 gm La Cl$_3$ 6H$_2$O dissolved in 30 ml H$_2$O at a pH of 6.5 (adjusted with 0.2N KOH) for 30 minutes. After filtration and drying the sample chemical analysis gave a stoichiometry of:

(0.4 K, 0.12 H, 0.16 La) Al SiO$_4$

What is claimed is:

1. A synthetic crystalline zeolite, ECR-33, having the composition in the dehydrated form, in terms of mole ratios:

(xK, yH, zR) AlSiO$_4$ where R are rare-earth elements having atomic numbers between 57 and 71, and an x-ray diffraction pattern given in Table 1, and x×=0.4 to 0.8; y=0 to 0.15; z=0.05 to 0.20.

2. The zeolite of claim 1 wherein said rare-earth is Lanthanum.

3. A process of preparing the material of claim 1 which comprises:
   (a) preparing zeolite Q; and
   (b) exchanging said zeolite Q with a solution of rare-earth elements having atomic numbers between 57 and 71 such that the pH does not fall below 4.5.

4. The zeolite of claim 1 admixed with precipitated rare-earth hydroxides and oxides.

5. The zeolite of claim 1 wherein R is cerium.

6. The zeolite of claim 1 wherein R is 90% comprising a mixture of lanthanum, cerium and neodymium.

* * * * *